United States Patent
Ali et al.

(10) Patent No.: US 10,613,208 B2
(45) Date of Patent: Apr. 7, 2020

(54) LOW COMPLEXITY SUPER-RESOLUTION TECHNIQUE FOR OBJECT DETECTION IN FREQUENCY MODULATION CONTINUOUS WAVE RADAR

(71) Applicant: Texas Instruments Incorporated, Dallas, TX (US)

(72) Inventors: Murtaza Ali, Plano, TX (US); Dan Wang, Dallas, TX (US); Muhammad Zubair Ikram, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 777 days.

(21) Appl. No.: 14/951,014

(22) Filed: Nov. 24, 2015

(65) Prior Publication Data

US 2016/0334502 A1 Nov. 17, 2016

Related U.S. Application Data

(60) Provisional application No. 62/162,405, filed on May 15, 2015.

(51) Int. Cl.
*G01S 13/34* (2006.01)
*G01S 7/35* (2006.01)

(52) U.S. Cl.
CPC ............ *G01S 13/343* (2013.01); *G01S 7/352* (2013.01); *G01S 2007/356* (2013.01)

(58) Field of Classification Search
CPC ..... G01S 13/34–348; G01S 7/352–354; G01S 2007/356–358
See application file for complete search history.

(56) References Cited

U.S. PATENT DOCUMENTS

| | | | | |
|---|---|---|---|---|
| 5,117,238 A | * | 5/1992 | Silverstein | H01Q 3/26 342/196 |
| 5,122,732 A | * | 6/1992 | Engeler | G01S 13/526 324/76.31 |

(Continued)

FOREIGN PATENT DOCUMENTS

| UA | 12453 A | 2/1997 |
|---|---|---|
| WO | WO2014106907 | 7/2014 |

OTHER PUBLICATIONS

Grigoryan D.S. et al., Sverkhrazreshenie po dalnosti pri obrabotke radiolokatsionnykh signalov s lineynoy chastotnoy modulyatsiey kegerentnym metodom lineynogo predskazaniya vpered-nazad s prorezhivaniem dannykh. Zhurnal radioelektroniki, 2011, No. 8, p. 1, p. 2, para 1, 3, p., para 1, 2, p. 4 para 2, p. 5 paragraph 2, p. 6, para 3, p. 9 para 2, p. 10, para 2, p. 11, para 3, p. 13, fig. 2, 3, 5, 6 (http://jre.cplire.ru/iso/aug11/2/text.html).

(Continued)

*Primary Examiner* — Matthew M Barker
(74) *Attorney, Agent, or Firm* — Brian D. Graham; Charles A. Brill; Frank D. Cimino

(57) ABSTRACT

In the proposed low complexity technique a hierarchical approach is created. An initial FFT based detection and range estimation gives a coarse range estimate of a group of objects within the Rayleigh limit or with varying sizes resulting from widely varying reflection strengths. For each group of detected peaks, demodulate the input to near DC, filter out other peaks (or other object groups) and decimate the signal to reduce the data size. Then perform super-resolution methods on this limited data size. The resulting distance estimations provide distance relative to the coarse estimation from the FFT processing.

10 Claims, 4 Drawing Sheets

(56) References Cited

U.S. PATENT DOCUMENTS

| | | | | |
|---|---|---|---|---|
| 5,168,214 A | * | 12/1992 | Engeler | G01R 23/165 |
| | | | | 324/76.33 |
| 5,748,507 A | * | 5/1998 | Abatzoglou | G01R 23/167 |
| | | | | 341/131 |
| 2010/0265138 A1 | | 10/2010 | Biem et al. | |
| 2010/0271254 A1 | | 10/2010 | Junji et al. | |
| 2015/0338514 A1 | * | 11/2015 | Sato | G01S 13/34 |
| | | | | 342/27 |

OTHER PUBLICATIONS

PCT Search Report for Application No. PCT/US 2016/032631, dated Sep. 1, 2016.

* cited by examiner

LOW COMPLEXITY SUPER-RESOLUTION TECHNIQUE FOR OBJECT DETECTION IN FREQUENCY MODULATION CONTINUOUS WAVE RADAR

CLAIM OF PRIORITY

This application claims priority under 35 U.S.C. 119(e)(1) to U.S. Provisional Application No. 62/162,405 filed May 15, 2015

TECHNICAL FIELD OF THE INVENTION

The technical field of this invention is radar object detection and corresponding object location determination.

BACKGROUND OF THE INVENTION

In classical object detection technique, the minimum distance to resolve two nearby objects (radar reflections) is limited by the so called Rayleigh distance. These techniques also often fail to find smaller objects in presence of close by larger objects. There exist several techniques known as super-resolution techniques to overcome these methods which can discriminate between objects even below the classical limits. However, these techniques are computationally expensive and rarely implemented in practice.

SUMMARY OF THE INVENTION

The solution to the computational problem is to perform an initial object detection using the classical method. In the context of FMCW (Frequency Modulated Continuous Wave) radar, this was done through Fast Fourier Transforms of the input data and then by searching for high valued amplitudes. Once potential objects are detected, super-resolution algorithms are performed around each of the detected objects or reflections. To reduce computational complexity of this search, the signal is demodulated so the detected object lies near DC values and then sub-sampled so the number of operating data points is reduced. The super-resolution technique then works on this reduced set of data thereby reducing computational complexity.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
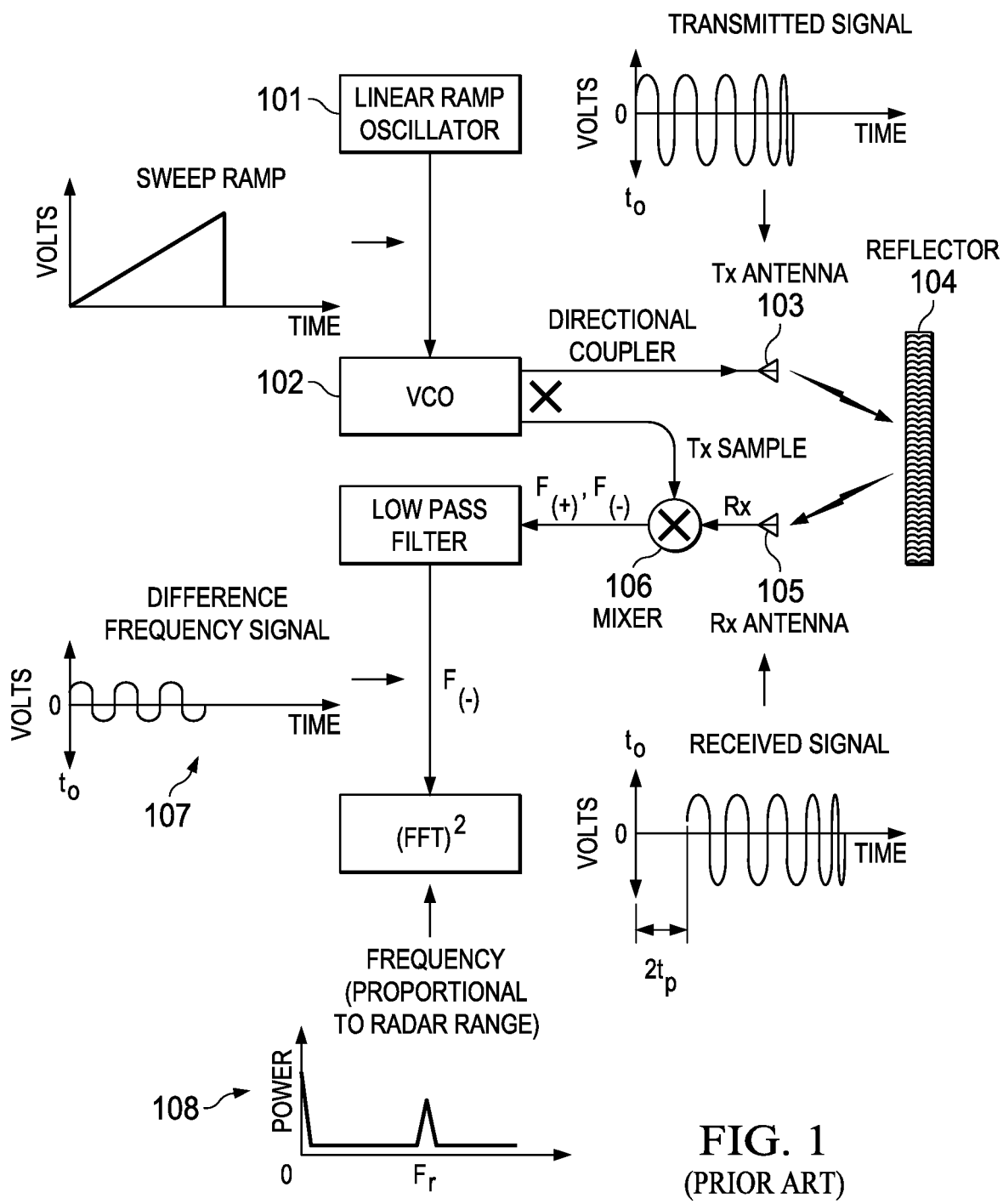
FIG. 1 illustrates a prior art FMCW radar to which this invention is applicable.

FMCW radars are often used to determine the location of an object and its speed of movement. These radars are used in automotive applications, industrial measurements, etc. A typical FMCW technique is shown in FIG. 1.

A chirp signal generated by ramp oscillator 101 and Voltage Controlled Oscillator (VCO) 102 (where the frequency is changed linearly) is transmitted by antenna 103 and reflected from object(s) 104. The reflected signal is received by antenna 105, mixed with transmitted signal in mixer 106 and the resulting beat frequency 107 is dependent on the distance of the object as given by $$\text{beat frequency} = \frac{B(2R)}{T_r c}$$

Thus, if the beat frequency or frequencies for multiple objects can be estimated, the distances to those objects can be estimated. In the above equation, R is the range of the object, B is the bandwidth of the chirp signal, $T_r$ is the time duration for the chirp and c is the speed of light.

In one commonly used object detection and distance estimation technique, the frequency is estimated using Fourier transforms. Usually an FFT (Fast Fourier Transform) is used. The peaks of the FFT output shown in graph 108 correspond to the objects detected and the frequencies of the peak correspond to the distances. In this technique, the minimum distance to resolve two objects and determine their respective distances are known as Rayleigh limit and is given by $$\frac{c}{2B}.$$

One issue with this detection method is when the reflectivities of the two closely spaced objects are different, the larger object tends to hide the smaller object.

In order to overcome the above limitations, super-resolution techniques have been proposed. Two such techniques are described here.

The first technique is called MUSIC (Multiple Signal Classification): it divides the signal auto-correlation matrix 301 $R_s$, into signal subspace and noise subspace 302. This is done by first using singular value decomposition (SVD) 303

$$R_s = Q \Lambda Q^H;$$

and then extracting the noise subspace from the eigenvectors with lowest eigenvalues 304

$$Q_n = Q(:,N-M,N)$$

N: data dimension, M: signal dimension;
this technique then creates MUSIC pseudo spectrum orthogonal to noise subspace using the following equation 305

$$P_{MUSIC}(\phi) = \frac{1}{S^H(\phi) Q_n Q_n^H s(\phi)};$$

and
finally a search for peaks in the above spectrum is carried out to determine the presence and the location of objects in 306.

The second technique called MPM (Matrix Pencil Method): create a Hankel matrix 401 with delayed signal vector $$S=[s_0\ s_1\ s_2\ \ldots\ s_{L-1}\ s_L]=[S_0\ s_L]=[s_0\ S_1]$$

$$s_n=[s(n)s(n+1)\ \ldots\ s(n+N-L-1)]^T;$$

and then solve a generalized eigenvalue problem of the matrix pencil in 402 (these eigenvalues encode the frequency estimates)

$$S_1 - \xi S_0.$$

The steps to solve the generalized eigenvalues problems are as follows: perform Singular Value Decomposition (SVD) 403 and choose M highest eigenvalues in 404

$$S^H S = U \Lambda U^H; U_M = U(:,1:M);$$

extract two eigenvector matrices in 405

$$U_{0M}=U(1:L-1,:), U_{1M}=U(2:L,:);$$

perform a second SVD in 406

$$U_{1M}{}^H U_{0M};$$

and extract frequencies from the resulting eigenvalues in 407 (the generalized eigenvalues).

Various variations of these techniques have been proposed. But, they all have the common operations of performing eigen-analysis of signal vectors. For a data size of N, the eigen-analysis has computational requirements on the order of $N^3$. For typical applications, N is on the order of 1000. This makes implementation of these techniques unfeasible for embedded real time applications.

Note that in FMCW radar applications, additional signal dimensions of speed, azimuth and elevation angle can be used whose impact is to increase the data size by several orders.

Figure 2:
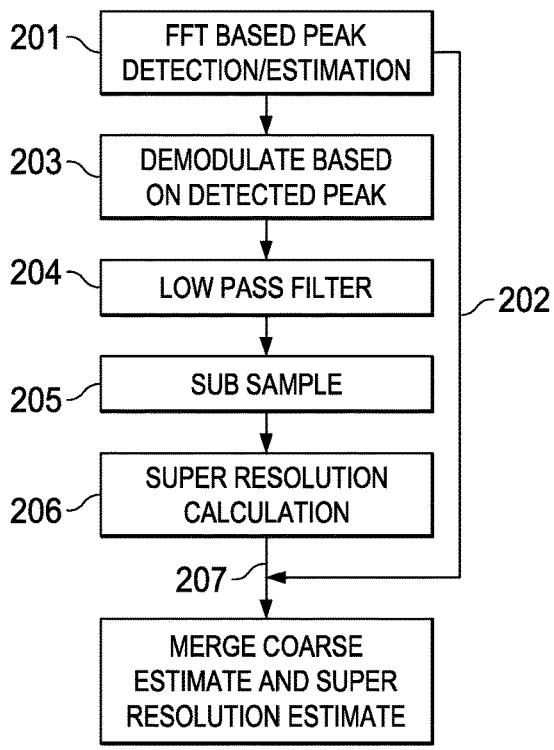
FIG. 2 illustrates the signal data processing of this invention.

In the proposed low complexity technique illustrated in FIG. 2, the super resolution techniques are combined with the FFT based method to create a hierarchical approach. First an FFT based detection and range estimation is performed in 201. This gives a coarse range estimate 202 of a group of objects within the Rayleigh limit or with varying sizes resulting from widely varying reflection strengths. For each group of detected peaks, the input is demodulated to near DC in 203, other peaks (or other object groups) are filtered out in 204 and the signal is then sub-sampled in 205 to reduce the data size. Super-resolution methods are then performed on this limited data size in 206. The resulting fine range estimations 207 provide distance relative to the coarse estimation done using FFT processing.

The following study shows simulation results using the following parameters: signal bandwidth of 4 GHz; chirp time duration of 125 microseconds; 2 objects at 5.9 meters and 6 meters in two examples (1) the objects have same the reflectivity and (2) the objects differ in reflectivity by 25 dB. The reflectivities are measured in terms of RCS (radar cross section).

Figure 5:
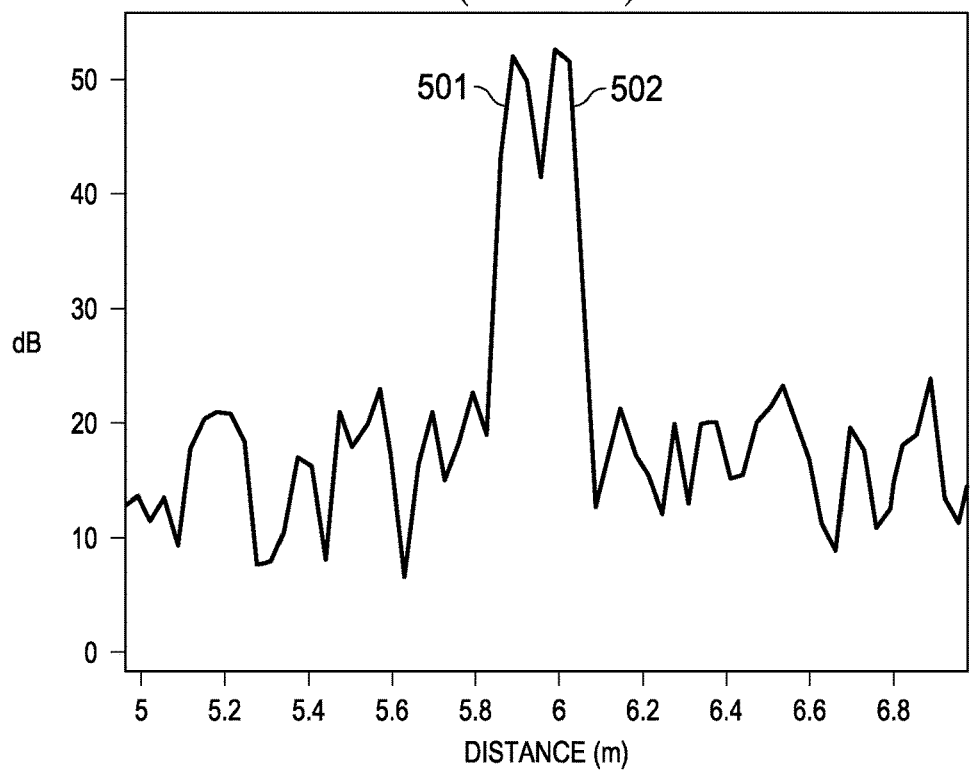
FIG. 5 illustrates results of conventional processing for two objects as differing ranges with the same reflectivity.
Figure 6:
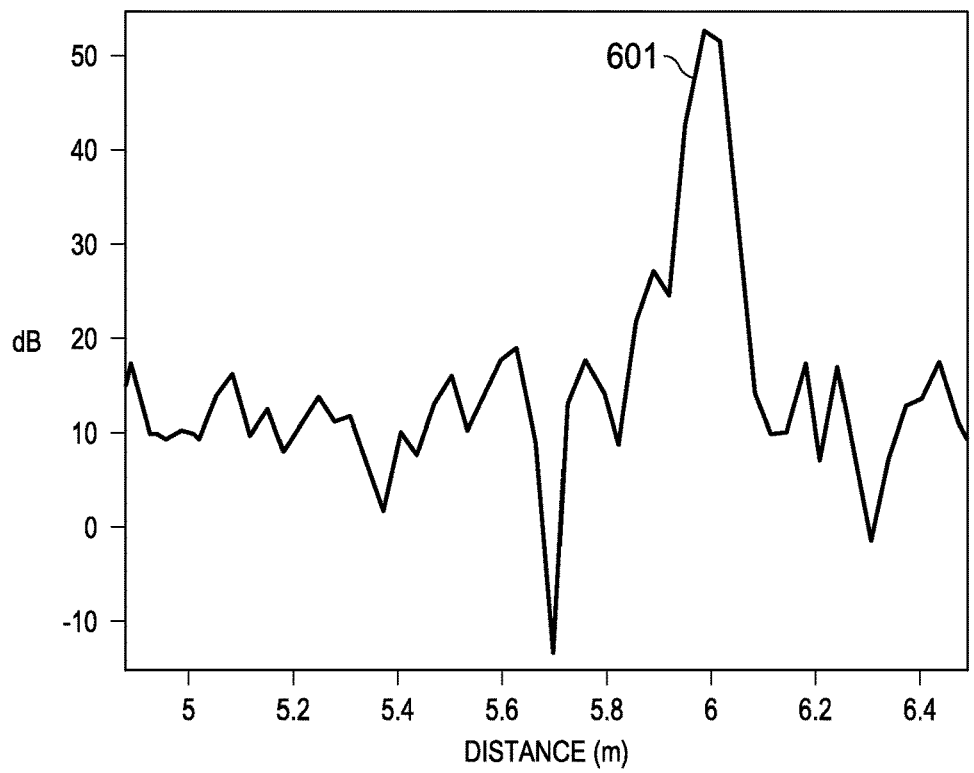
FIG. 6 illustrates results of conventional processing for two objects as differing ranges with one object having 25 dB less reflectivity.

The output of the prior art FFT based processing are shown in FIGS. 5 and 6. FIG. 5 (corresponding to the same RCS of two objects) shows the two peaks 501 and 502 corresponding to the two objects. In FIG. 6 where the RCS of one object is 25 dB lower, the smaller object cannot be detected and is hidden with the spread of the peak of the larger object 601. The data size used is 512 data points.

Figure 3:
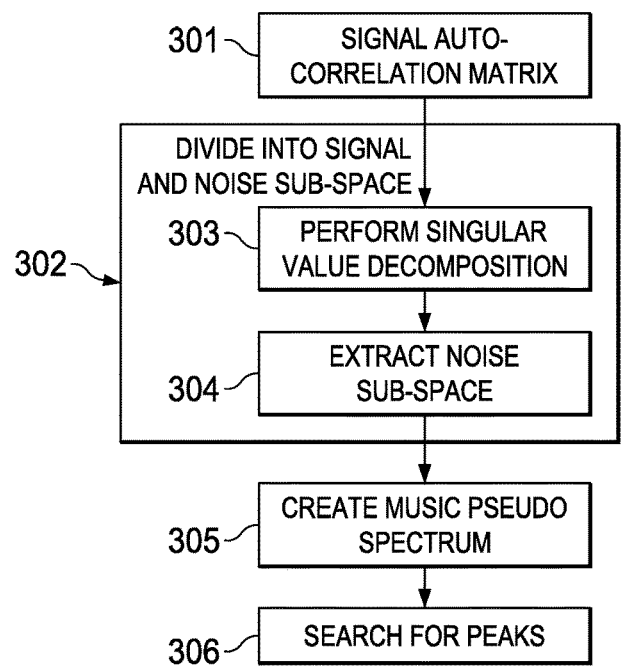
FIG. 3 shows the steps involved in the multiple signal classification algorithm.
Figure 4:
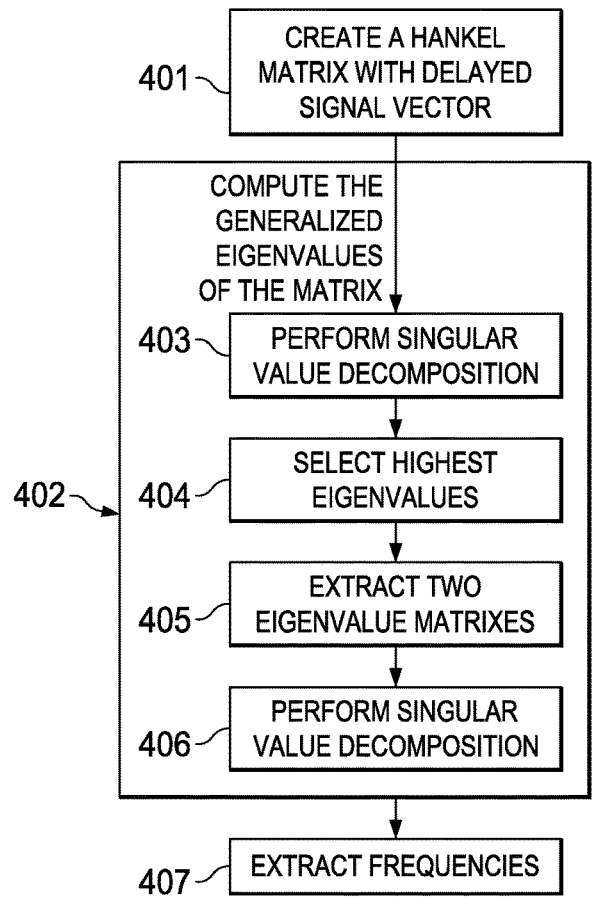
FIG. 4 shows the steps involved in the matrix pencil algorithm.
Figure 7:
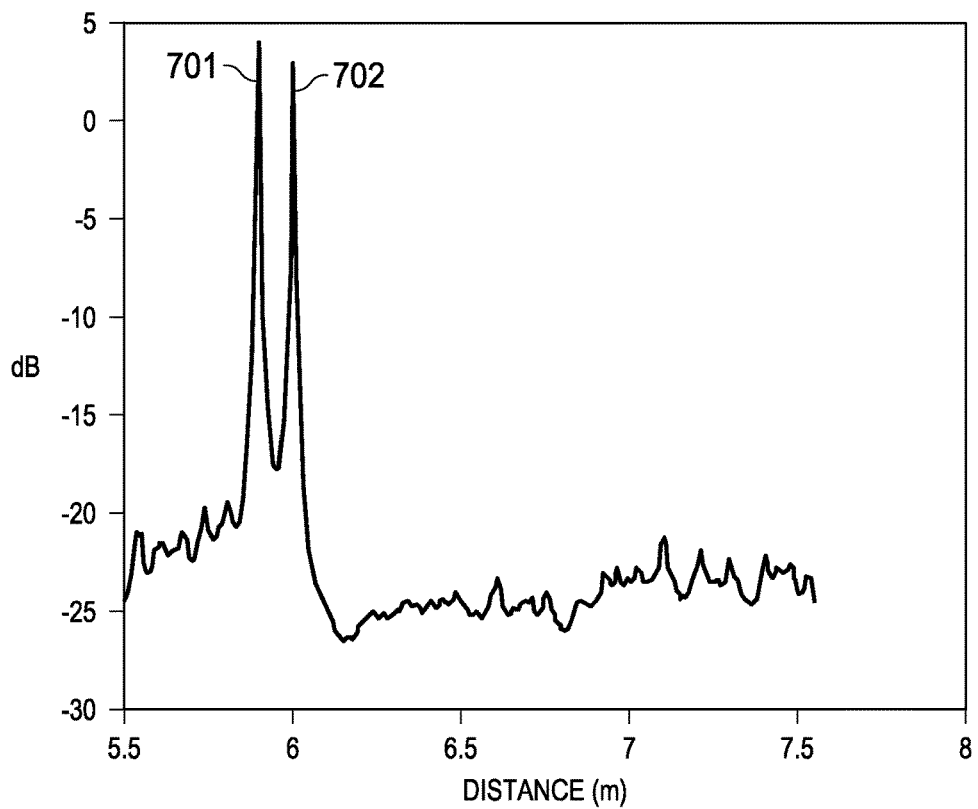
FIG. 7 illustrates results of processing according to this invention for two objects as differing ranges with the same reflectivity.
Figure 8:
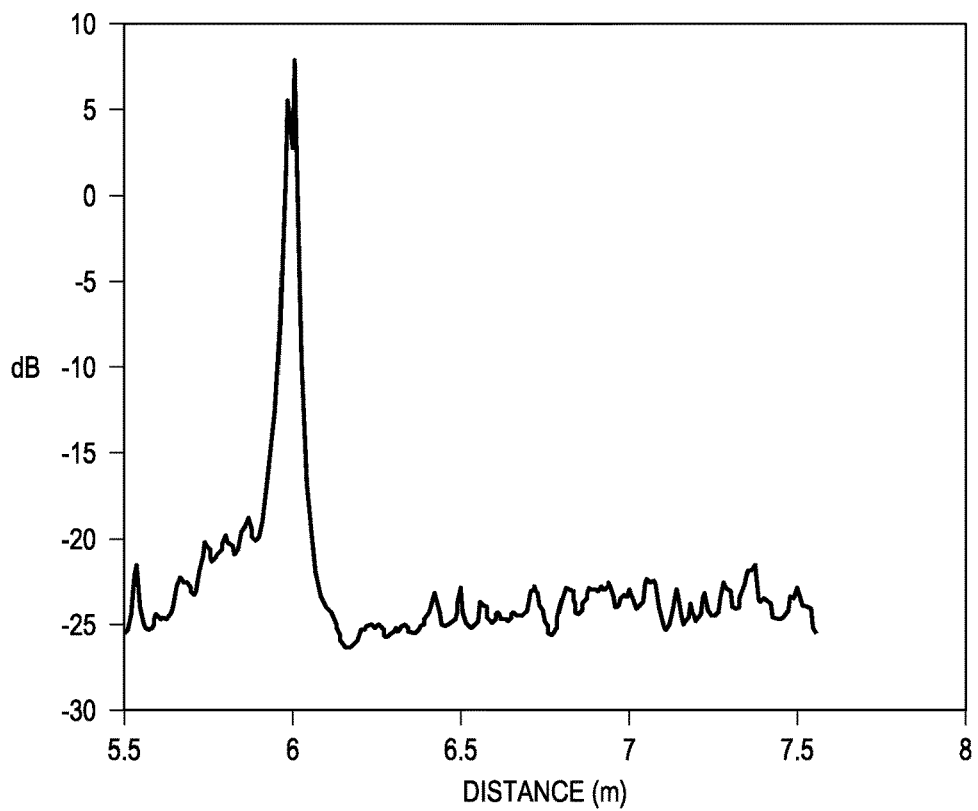
FIG. 8 illustrates results of processing according to this invention for two objects as differing ranges with one object having 25 dB less reflectivity.

The data size is then reduced to 32 data points using the technique of this invention leading a computation complexity reduction by a factor of $16^3$. The output of the MUSIC method (described in FIG. 3) is shown in FIGS. 7 and 8. FIG. 7 shows much sharper peaks 701 and 702 for the case of same RCS. FIG. 8 shows that an object is still missed for the case of 25 dB RCS difference.

It is not possible to provide pictorial output from the simulation of the MPM matrix pencil method like shown in FIGS. 7 and 8. However, if we run matrix pencil on this reduced data set, it provides two distance estimates for both the same RCS, and 25 dB RCS difference. The results are noted below. For the same RCS: the distance estimates are distance1=6.0012 m and distance2=5.8964 m. For 25 dB difference RCS: the distance estimates are distance1=5.9990 m and distance2=5.8602 m. Comparing with the fact that the objects are placed at 5.9 and 6 m, the MPM method provided the distances accurately with much reduced complexity.

What is claimed is:

1. A method comprising:
   generating a first signal having a linearly changing frequency;
   transmitting from a transmitter the first signal in a direction of an object to be detected;
   receiving a reflected signal corresponding to a reflection of the first signal from the object;
   mixing the received reflected signal with the first signal to determine a beat frequency signal for the object;
   applying a Fourier transform on the beat frequency signal to obtain a Fourier transform output signal having a first data size;
   identifying a peak in the Fourier transform output signal that corresponds to the object, wherein a frequency of the identified peak corresponds to a coarse range estimate of a distance of the object relative to the transmitter;
   applying demodulation to the Fourier transform output signal to obtain a demodulated signal;
   applying filtering to the demodulated signal to filter out peaks that do not correspond to the object;
   sub-sampling the filtered demodulated signal to obtain a sub-sampled set of data having a second data size that is less than the first data size; and
   determining, based on the sub-sampled set of data, a fine range estimate of the distance of the object relative to the transmitter, the fine range estimate being more precise relative to the coarse range estimate.

2. The method of claim 1, wherein determining the fine range estimate of the distance of the object relative to the transmitter includes performing an eigen-analysis on the sub-sampled set of data.

3. The method of claim 1, wherein determining the fine range estimate of the distance of the object relative to the transmitter includes applying a multiple signal classification (MUSIC) super resolution processing technique to the sub-sampled set of data by:
   applying singular value decomposition (SVD) to a signal auto-correlation matrix corresponding to the sub-sampled set of data to obtain an SVD result;
   dividing the signal auto-correlation matrix into a signal subspace and a noise subspace by extracting, from the SVD result, eigenvectors from the SVD result that have the lowest eigenvalues as corresponding to the noise subspace, the remaining eigenvectors from the SVD result corresponding to the signal subspace;
   creating a MUSIC pseudo-spectrum orthogonal to the noise subspace; and
   searching for peaks in the MUSIC pseudo-spectrum.

4. The method of claim 1, wherein determining the fine range estimate of the distance of the object relative to the transmitter includes applying a matrix pencil method (MPM) super resolution processing technique to the sub-sampled set of data by:
    creating a Hankel matrix with a delayed signal vector;
    applying a first singular value decomposition (SVD) on the Hankel matrix to obtain a first SVD result;
    selecting a predetermined number of highest eigenvalues from the first SVD result;
    extracting two eigenvector matrices;
    applying a second SVD on the two extracted eigenvector matrices to obtain a second SVD result; and
    searching for peaks within eigenvalues of the second SVD result.

5. The method of claim 1, wherein applying the Fourier transform includes applying a Fast Fourier transform (FFT).

6. An apparatus comprising:
    a linear ramp oscillator (LRO);
    a voltage controlled oscillator (VCO) configured to be controlled by an output of the LRO to produce a first signal having a linearly changing frequency;
    an antenna configured to transmit the first signal;
    an antenna configured to receive a reflected signal corresponding to a reflection of the first signal from an object to be detected;
    a mixer configured to mix the first signal with the received reflected signal to determine a beat frequency signal for the object; and
    a processor configured to execute instructions stored in a memory to perform:
        applying a Fourier transform on the beat frequency signal to obtain a Fourier transform output signal having a first data size;
        identifying a peak in the Fourier transform output signal that corresponds to the object, wherein a frequency of the identified peak corresponds to a coarse range estimate of a distance of the object relative to the transmitter;
        applying demodulation to the Fourier transform output signal to obtain a demodulated signal;
        applying filtering to the demodulated signal to filter out peaks that do not correspond to the object;
        sub-sampling filtered demodulated signal to obtain a sub-sampled set of data having a second data size that is less than the first data size; and
        applying a super resolution processing technique that is selected as one of Multiple Signal Classification (MUSIC) or Matric Pencil Method (MPM) to the reduced version of the Fourier transform output to determine a fine range estimate of the distance of the object relative to the transmitter that is more precise relative to the coarse range estimate.

7. The apparatus of claim 6, wherein determining the fine range estimate of the distance of the object relative to the transmitter includes performing an eigen-analysis on the sub-sampled set of data.

8. The apparatus of claim 6, wherein determining the fine range estimate of the distance of the object relative to the transmitter includes applying a multiple signal classification (MUSIC) super resolution processing technique to the sub-sampled set of data by:
    applying singular value decomposition (SVD) to a signal auto-correlation matrix corresponding to the sub-sampled set of data to obtain an SVD result;
    dividing the signal auto-correlation matrix into a signal subspace and a noise subspace by extracting, from the SVD result, eigenvectors from the SVD result that have the lowest eigenvalues as corresponding to the noise subspace, the remaining eigenvectors from the SVD result corresponding to the signal subspace;
    creating a MUSIC pseudo-spectrum orthogonal to the noise subspace; and
    searching for peaks in the MUSIC pseudo-spectrum.

9. The apparatus of claim 6, wherein determining the fine range estimate of the distance of the object relative to the transmitter includes applying a matrix pencil method (MPM) super resolution processing technique to the sub-sampled set of data by:
    creating a Hankel matrix with a delayed signal vector;
    applying a first singular value decomposition (SVD) on the Hankel matrix to obtain a first SVD result;
    selecting a predetermined number of highest eigenvalues from the first SVD result;
    extracting two eigenvector matrices;
    applying a second SVD on the two extracted eigenvector matrices to obtain a second SVD result; and
    searching for peaks within eigenvalues of the second SVD result.

10. The apparatus of claim 6, wherein applying the Fourier transform includes applying a Fast Fourier transform (FFT).

\* \* \* \* \*